Z. SWEARINGEN.
EXHAUST SILENCER.
APPLICATION FILED JAN. 27, 1912.
1,030,347.
Patented June 25, 1912.
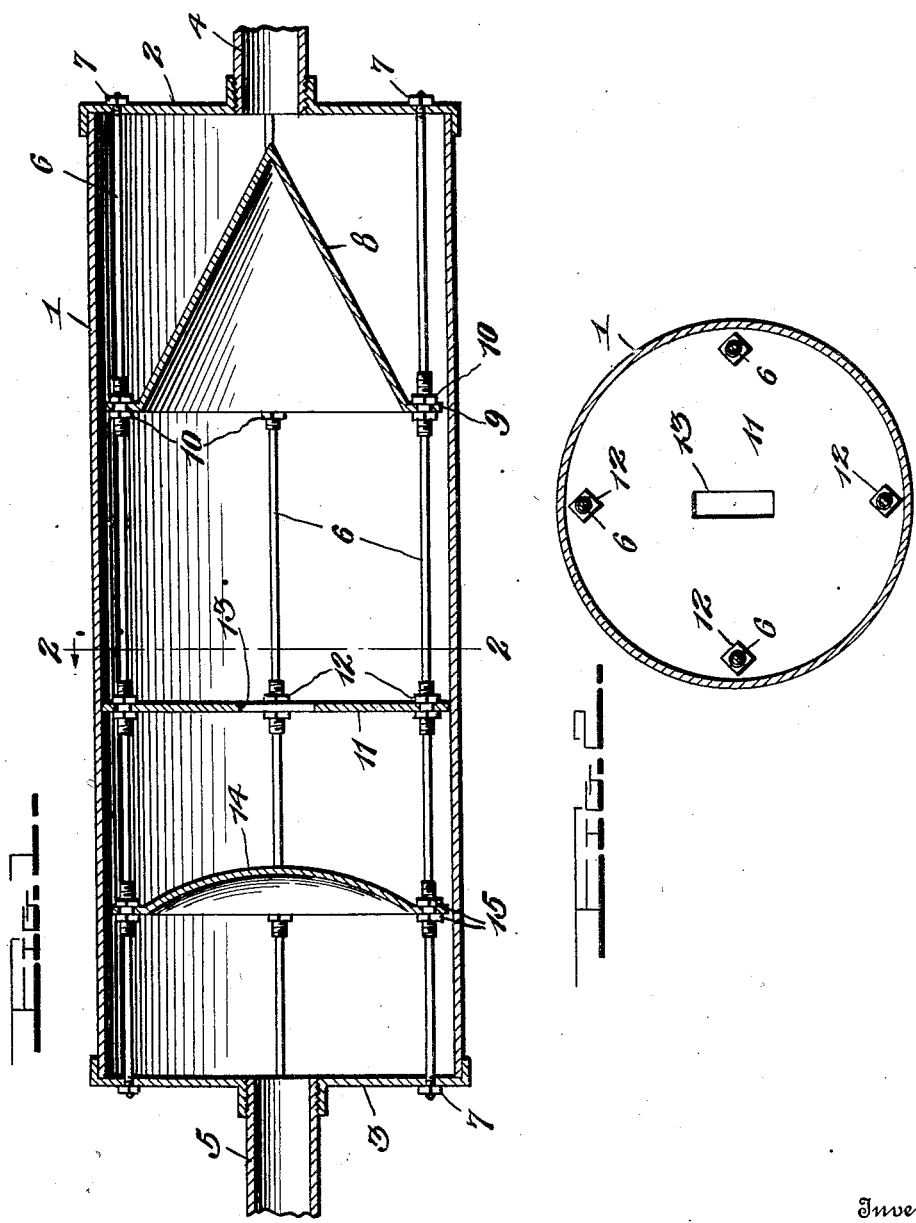
Witnesses
Chas. L. Griesbauer.
G. B. Norton.
Inventor
Z. Swearingen,
By Watson E. Coleman,
Attorney

UNITED STATES PATENT OFFICE.

ZACHARIAH SWEARINGEN, OF OSCEOLA, IOWA.

EXHAUST-SILENCER.

1,030,347.   Specification of Letters Patent.   Patented June 25, 1912.

Application filed January 27, 1912. Serial No. 673,791.

*To all whom it may concern:*

Be it known that I, ZACHARIAH SWEARINGEN, a citizen of the United States, residing at Osceola, in the county of Clarke and State of Iowa, have invented certain new and useful Improvements in Exhaust-Silencers, of which the following is a specification, reference being had to the accompanying drawings.

My invention relates to new and useful improvements in exhaust silencers, known particularly to those working in the art as mufflers and my object is to provide a device of this character which may be readily applied to use in connection with the exhaust pipe of explosive engines to suppress the noise of the escaping gases and products of combustion.

A further object of the invention resides in providing a device of this character which will have a maximum cooling effect upon the exhausting gases and a still further object resides in providing a device which is so constructed as to prevent back pressure from affecting the power of the engine.

Another object of my invention resides in providing a device which is simple and durable in construction, inexpensive to manufacture and one which will be very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a vertical longitudinal section through the device and Fig. 2 is a horizontal section therethrough as seen on line 2—2 of Fig. 1.

In carrying out my invention I shall refer to the drawing in which similar reference characters designate corresponding parts throughout the several views and in which—

1 indicates a housing, preferably of cylindrical design, the heads or end walls 2 and 3 of which have respectively threaded in engagement therewith the conduits or pipes 4 and 5 said pipes forming the inlet and outlet ports, respectively, of the device. These heads or end walls 2 and 3 are removably mounted on the housing or cylinder 1 by means of the bolts or shafts 6 which extend longitudinally through said housing and have the ends thereof threaded to receive the nuts 7, whereby said heads will be securely held to the housing.

As stated, the conduit or pipe 4 forms the inlet port for the exhaust to the housing 1 and disposed in the housing 1 is a cone shaped deflector 8, the apex of which is positioned immediately adjacent the entrance of the port 4 to the housing, said deflector being hollow and provided with a peripheral flange 9 at the flaring edge thereof. In order to securely mount the deflector in the housing, to permit a space to intervene between the flaring end of the same and the inner wall of the housing, the bolts 6 are disposed through openings in the flange 9 thereof and nuts 10 are engaged with threaded portions of said bolts or shafts 6 above and below said flange 9. An additional deflector plate 11 is provided, the same being circular in design to allow the periphery thereof to snugly fit the inner periphery of the housing and said plate is also held to the bolts or shafts 6, which extend therethrough, by means of nuts 12 which engage additional threaded portions of the bolts and contact with the upper and lower faces of the plate. Said plate is provided with a central restricted opening 13 whereby the products of combustion after passing through the space left between the deflector 8 and the wall of the housing 1 may unite and pass therethrough and an additional deflector plate 14 is provided beyond the plate 11. This plate 14 is of concavo-convex design, the convex portion thereof facing the plate 11 and the same is held to the bolts or shafts 6 by means of the nuts 15, in a manner similar to the manner in which the deflectors 8 and 11 are secured thereto. This plate 14, however, is of a diameter substantially equal to the diameter of the flaring end of the deflector 8, thereby providing a space between the peripheral edge of the same and the inner wall of the housing to permit the products of combustion, after passing through the openings 13 in the plate 11, to be separated and pass therearound to the outlet port 5.

In practice, it will be seen that this device may be readily applied to the exhaust pipe of an explosive engine and as the exhaust enters the housing 1 through the pipe 4, the same will be broken or separated to cause the products of combustion to pass around the cone-like deflector 8 and through the space between the flaring end of said deflector and the wall of said housing. After passing through the space mentioned, the products will have a tendency to unite to strike the deflector plate 11 through which said products may pass, in view of the restricted opening 13 therein, but it will be appreciated that a certain amount of the exhaust will rebound from the plate 11 and such back pressure will be caught by the cone-like deflector 8, thereby preventing this back pressure from affecting the engine proper. After passing through the restricted opening 13 in the plate 11, the products of combustion will strike against the convex plate 14 where the same will again be caused to separate in order to pass therebeyond, the same passing through the space between the peripheral edge of said plate and the inner wall of the housing to unite therebeyond and pass through the outlet pipe 5. By the time the products of combustion reach the outlet pipe, it will be appreciated that the same will be cooled to a considerable extent and that the sound incident to the explosion will be suppressed. It will also be appreciated that in view of the fact that there are no minute openings through which the products are to pass, there will be no clogging of the same to prevent the effective operation of the device, but should it be desired, at any time, to remove the deflector plates for cleaning purposes, it will be seen that it is only necessary to remove the nuts at the one end of the bolts or shafts 6 whereupon the opposite head or end wall of the housing together with the bolts and division or deflector plates thereon may be readily removed. Should it be found necessary, at any time whatsoever, to remove any of the deflectors 8, 11 or 14 the same may be readily accomplished by merely removing the nuts which secure the same to the bolts or shafts 6 and thus it will be appreciated that little or no trouble will be experienced in either setting up the device or taking the same down for cleaning purposes. Furthermore, it will be seen that the back pressure incident to most mufflers or exhaust silencers of this type will not materially affect the engine in view of the cone-like deflector which is positioned adjacent the inlet port and thus all danger of the device blowing up will be eliminated.

From the foregoing it will be seen that I have provided a simple, inexpensive and efficient means for carrying out the objects of my invention, but while I have particularly described the elements most well adapted to perform the functions set forth it is obvious that various changes in form, proportion and in the minor details of construction may be resorted to without departing from the spirit or sacrificing any of the principles of the invention.

Having thus described my invention what I claim is:

1. A muffler comprising a cylindrical member having removable heads thereon, said heads being provided respectively with inlet and outlet ports, tie rods extending through said cylinder to secure the heads in position thereon, a substantially conical deflector member carried within the cylinder, the apex of said member being disposed immediately adjacent the inlet port of the cylinder, a pair of additional deflector plates within said cylinder, one of said plates having the peripheral edge thereof contacting with the inner wall of the cylinder and provided with a central opening, the other plate being of concavo convex design, and means to removably secure all of said deflector members to the tie rods.

2. A muffler comprising a cylindrical member having removable heads thereon, said heads being provided respectively with inlet and outlet ports, tie rods extending through said cylinder and securing the heads in position thereon, said tie rods being threaded at predetermined points thereon, a conical deflector disposed within the cylinder and having an annular flange formed on the flared portion thereof through which said tie rods extend, the apex of said conical deflector being disposed immediately adjacent the inlet port and the outer periphery of the aforesaid flange on said deflector being slightly spaced from the inner wall of said cylinder, an additional deflector member of concavo-convex design disposed within the cylinder adjacent the outlet port thereof, said latter deflector also having an annular flange thereon through which said tie rods extend and arranged to dispose the concaved portion of the same toward the outlet of the cylinder, the peripheral edge of said concavo-convex deflector being also spaced from the inner wall of said cylinder, an intermediate deflector plate of circular design having a central slot therein, the aforesaid tie rods extending through said latter plate and the peripheral edge of said plate being disposed in contact with the inner wall of said cylinder and means engaging the threaded portions of said tie rods and said deflector members to removably and adjustably secure the latter to the former at the predetermined points thereon.

In testimony whereof I hereunto affix my signature in the presence of two witnesses.

ZACHARIAH SWEARINGEN.

Witnesses:
  ELON GRAVES,
  LLOYD THURSTON.